(12) United States Patent
Jellinggaard et al.

(10) Patent No.: US 11,872,507 B2
(45) Date of Patent: Jan. 16, 2024

(54) FILTER CANDLE AND METHOD FOR OPERATING SUCH FILTER CANDLE

(71) Applicant: BOLLFILTER NORDIC APS, Birkerød (DK)

(72) Inventors: Robert Jellinggaard, Birkerød (DK); Sigurd Ildvedsen, Birkerød (DK)

(73) Assignee: BOLLFILTER NORDIC APS, Birkerød (DK)

( * ) Notice: Subject to any disclaimer, the term of this patent is extended or adjusted under 35 U.S.C. 154(b) by 334 days.

(21) Appl. No.: 17/293,546

(22) PCT Filed: Nov. 13, 2019

(86) PCT No.: PCT/EP2019/081183
§ 371 (c)(1),
(2) Date: May 13, 2021

(87) PCT Pub. No.: WO2020/099489
PCT Pub. Date: May 22, 2020

(65) Prior Publication Data
US 2022/0001310 A1    Jan. 6, 2022

(30) Foreign Application Priority Data
Nov. 14, 2018 (DK) .......................... PA 2018 70747

(51) Int. Cl.
*B01D 29/68* (2006.01)
*B01D 29/35* (2006.01)

(52) U.S. Cl.
CPC ........... *B01D 29/682* (2013.01); *B01D 29/35* (2013.01); *B01D 29/688* (2013.01); *B01D 2201/583* (2013.01)

(58) Field of Classification Search
None
See application file for complete search history.

(56) References Cited

U.S. PATENT DOCUMENTS

| 540,993 | A | * | 6/1895 | Kupperle | ............... | B01D 29/33 |
| | | | | | | 210/397 |
| 602,868 | A | * | 4/1898 | Nilson | .................. | B01D 45/14 |
| | | | | | | 122/492 |

(Continued)

FOREIGN PATENT DOCUMENTS

| DE | 4424232 C1 | 5/1995 |
| EP | 0429409 A1 | 5/1991 |

(Continued)

OTHER PUBLICATIONS

Danish Search Report for Danish Application No. PA201870747, dated May 15, 2019.

(Continued)

*Primary Examiner* — Robert J Popovics
(74) *Attorney, Agent, or Firm* — Birch, Stewart, Kolasch & Birch, LLP (57) ABSTRACT

A filter candle (1) in a backflush filter housing (2) has a cylindrical filter wall (3) and includes an internal hollow flushing element (8) divided into a flushing section (9) having a flushing port (10) for backflushing and a turbine section (11) for rotation of the flushing element. The flushing section tapers from a first end to a second end. The turbine section tapers from a first end to a second end and has turbine blades arranged on the outside. The first end of the flushing section is connected to the first end of the turbine section at a transition position (21). An outside of the flushing element forms a cylindrical restriction at the transition position so that the part of the cylindrical filter wall of the filter candle extending at the turbine section may be backflushed by means of fluid also driving the turbine.

20 Claims, 6 Drawing Sheets

(56) References Cited

U.S. PATENT DOCUMENTS

| | | | | |
|---|---|---|---|---|
| 630,024 A * | 8/1899 | Baker | F22B 37/263 | 122/491 |
| 773,220 A * | 10/1904 | Pattersom | B03B 9/061 | 68/1 |
| 814,837 A * | 3/1906 | Fenton | B01D 46/4272 | 15/340.1 |
| 969,364 A * | 9/1910 | Grootenhuis | B01D 33/70 | 210/354 |
| 1,333,249 A * | 3/1920 | Fiddyment | B30B 9/12 | 100/148 |
| 1,438,553 A * | 12/1922 | Quam | F02M 35/022 | 55/DIG. 28 |
| 1,527,355 A * | 2/1925 | Gentile | F02M 33/02 | 55/DIG. 28 |
| 1,703,867 A * | 3/1929 | Bursley | F02M 33/02 | 123/25 J |
| 1,741,444 A * | 12/1929 | Slider | B01D 29/6415 | 210/355 |
| 1,944,267 A * | 1/1934 | Rathbun | B01D 46/682 | 55/327 |
| 2,006,244 A * | 6/1935 | Kopsa | B01D 45/14 | 55/403 |
| 2,053,856 A * | 9/1936 | Weidenbacker | B01D 35/14 | 494/84 |
| RE20,672 E * | 3/1938 | Kopsa | F25B 43/02 | 62/470 |
| RE20,885 E * | 10/1938 | Kopsa | B01D 45/14 | 48/189.5 |
| 2,408,741 A * | 10/1946 | Dodge | B01D 29/356 | 210/355 |
| 2,617,273 A * | 11/1952 | Findlay | B01D 9/004 | 23/296 |
| 2,954,841 A * | 10/1960 | Reistle, Jr. | B01D 19/0052 | 55/416 |
| 3,230,865 A * | 1/1966 | Franz | B30B 9/18 | 100/339 |
| 3,249,227 A * | 5/1966 | Long | E21B 21/063 | 210/512.1 |
| 3,275,148 A * | 9/1966 | Vicino | F16N 39/00 | 210/411 |
| 3,447,290 A * | 6/1969 | Flory | B01D 45/14 | 55/432 |
| 3,478,679 A * | 11/1969 | Bauserman | B30B 9/122 | 100/150 |
| 3,631,985 A * | 1/1972 | Taeger | B01D 35/06 | 210/222 |
| 3,645,699 A * | 2/1972 | Brodie | B01D 9/0059 | 62/545 |
| 3,759,392 A * | 9/1973 | Syrjanen | B01D 29/682 | 210/415 |
| 3,816,981 A * | 6/1974 | Carnewal | B01D 45/14 | 55/467 |
| 3,879,294 A * | 4/1975 | Ellis | F15B 21/041 | 494/36 |
| 3,938,434 A * | 2/1976 | Cox | B30B 9/12 | 100/145 |
| 3,997,441 A * | 12/1976 | Pamplin, Jr. | B01D 37/02 | 210/791 |
| 4,041,854 A * | 8/1977 | Cox | B30B 9/12 | 100/145 |
| 4,090,965 A * | 5/1978 | Fuchs | B01D 33/74 | 210/402 |
| 4,130,389 A * | 12/1978 | Kaburagi | F23D 14/24 | 431/183 |
| 4,361,490 A * | 11/1982 | Saget | B04B 5/12 | 210/512.3 |
| 4,429,628 A * | 2/1984 | Koch | B30B 9/12 | 100/150 |
| 4,457,227 A * | 7/1984 | Koch | B30B 9/121 | 100/117 |
| 4,581,992 A * | 4/1986 | Koch | B30B 9/121 | 100/150 |
| 4,629,481 A * | 12/1986 | Echols | B04C 3/04 | 122/34 |
| 4,692,247 A * | 9/1987 | Orlans | B01D 29/117 | 210/488 |
| 4,731,182 A * | 3/1988 | High | B04B 1/20 | 210/374 |
| 4,781,825 A * | 11/1988 | Grimes | B01D 29/114 | 55/284 |
| 4,872,761 A * | 10/1989 | Geyer | B29B 7/42 | 425/208 |
| 4,981,364 A * | 1/1991 | Geyer | B29C 48/56 | 366/90 |
| 5,050,772 A * | 9/1991 | Brane | G01F 15/001 | 222/14 |
| 5,065,901 A * | 11/1991 | Brane | G01F 1/06 | 222/14 |
| 5,160,441 A * | 11/1992 | Lundquist | B01D 33/466 | 134/17 |
| 5,186,834 A * | 2/1993 | Arai | B01D 29/6476 | 210/497.1 |
| 5,622,618 A * | 4/1997 | Brane | B01D 29/114 | 210/100 |
| 5,662,035 A * | 9/1997 | Lee | B30B 9/26 | 100/145 |
| 5,871,652 A * | 2/1999 | England | B01D 29/52 | 210/791 |
| 5,904,858 A * | 5/1999 | Turchetti | B01D 29/6446 | 210/405 |
| 6,001,242 A * | 12/1999 | England | B01D 29/52 | 210/194 |
| 6,096,198 A * | 8/2000 | Underhill | C10M 175/04 | 210/123 |
| 6,110,386 A * | 8/2000 | Underhill | B23Q 11/1069 | 261/119.1 |
| 6,200,361 B1 * | 3/2001 | Krymsky | B01D 50/00 | 55/319 |
| 6,241,902 B1 * | 6/2001 | Huebner | B30B 9/12 | 210/791 |
| 6,547,972 B1 * | 4/2003 | Stahl | B04B 3/02 | 210/781 |
| 6,730,219 B2 * | 5/2004 | Turchetti | B01D 29/96 | 210/411 |
| 6,780,147 B2 * | 8/2004 | Koch | B04B 1/20 | 494/53 |
| 6,790,169 B2 * | 9/2004 | Koch | B04B 11/06 | 494/53 |
| 7,018,326 B2 * | 3/2006 | Koch | B04B 1/20 | 494/53 |
| 7,258,713 B2 * | 8/2007 | Eubank | F02M 35/022 | 55/401 |
| 7,297,265 B1 | 11/2007 | Booth et al. | | |
| 7,892,424 B2 * | 2/2011 | Mayrand | C02F 3/1242 | 210/523 |
| 7,972,108 B2 * | 7/2011 | Fonkenell | F03B 13/08 | 415/121.2 |
| 8,182,674 B2 * | 5/2012 | Prigent | F03B 11/08 | 415/121.2 |
| 8,425,670 B2 * | 4/2013 | Carlsson | C10G 31/10 | 95/19 |
| 8,623,212 B2 * | 1/2014 | Irvin, Sr. | F04D 29/708 | 210/512.3 |
| 8,636,910 B2 * | 1/2014 | Irvin, Sr. | F04D 29/4273 | 210/780 |
| 9,327,219 B2 * | 5/2016 | Brunswick | B01D 29/114 | |
| 9,358,482 B2 * | 6/2016 | Morgan | B01D 29/94 | |
| 9,737,896 B2 * | 8/2017 | Sugawara | B04B 1/20 | |
| 10,646,801 B2 * | 5/2020 | Tameroglu | B01D 29/6415 | |
| 11,225,041 B2 * | 1/2022 | Sands | B30B 9/12 | |
| 2003/0042194 A1 * | 3/2003 | Turchetti | B01D 29/6476 | 210/414 |
| 2004/0238435 A1 * | 12/2004 | Olson | B01D 29/682 | 210/413 |
| 2006/0054549 A1 * | 3/2006 | Schoendorfer | B01D 29/906 | 210/321.87 |
| 2008/0110140 A1 * | 5/2008 | Egger | B01D 50/20 | 55/337 |

(56) References Cited

U.S. PATENT DOCUMENTS

| | | | | |
|---|---|---|---|---|
| 2009/0250386 | A1* | 10/2009 | Mayrand | C02F 3/1242 210/151 |
| 2009/0321333 | A1* | 12/2009 | Magliocca | A47J 37/1223 210/167.28 |
| 2010/0013232 | A1* | 1/2010 | Prigent | B04C 1/00 210/171 |
| 2010/0260622 | A1* | 10/2010 | Couston | F03B 3/02 417/375 |
| 2011/0271675 | A1* | 11/2011 | Toulouse | B01D 19/0036 60/639 |
| 2011/0293400 | A1* | 12/2011 | Bremond | F03B 3/18 415/150 |
| 2012/0048813 | A1* | 3/2012 | Irvin, Sr. | F04D 5/001 210/512.3 |
| 2013/0008541 | A1* | 1/2013 | Irvin, Jr. | F04D 5/001 415/220 |
| 2014/0007770 | A1* | 1/2014 | Gaebler | B01D 45/12 95/272 |
| 2014/0013764 | A1* | 1/2014 | Biagioli | F23C 7/004 60/748 |
| 2015/0165354 | A1* | 6/2015 | Brunswick | B01D 29/15 210/415 |
| 2019/0201818 | A1* | 7/2019 | Johann | B01D 29/688 |
| 2020/0230530 | A1* | 7/2020 | Levitt | B01D 11/0288 |
| 2020/0254463 | A1* | 8/2020 | Goertz | B01D 29/073 |
| 2021/0023482 | A1* | 1/2021 | Eisen | B01D 29/6453 |
| 2021/0394093 | A1* | 12/2021 | Cao | B01D 33/15 |
| 2022/0001310 | A1* | 1/2022 | Jellinggaard | B01D 29/688 |
| 2022/0047973 | A1* | 2/2022 | Eisen | B01D 29/606 |
| 2023/0182046 | A1* | 6/2023 | Gilboa | B01D 29/23 210/106 |

FOREIGN PATENT DOCUMENTS

| WO | WO 2014/080329 A1 | 5/2014 |
|---|---|---|
| WO | WO 2018/002384 A1 | 1/2018 |

OTHER PUBLICATIONS

International Search Report for International Application No. PCT/EP2019/081183, dated Jan. 23, 2020.

* cited by examiner

FILTER CANDLE AND METHOD FOR OPERATING SUCH FILTER CANDLE

BACKGROUND OF THE INVENTION

Field of the Invention and Overview

The present invention relates to a filter candle for mounting in a backflush filter housing, the filter candle having a cylindrical filter wall which encloses an interior of the filter candle and which is formed by a filter medium through which fluid to be filtered may flow from the interior to an outside of the filter candle, the cylindrical filter wall having an inner diameter, the filter candle having a first end and a second end of which at least one is open for fluid flow to the interior of the filter candle and a central axis extending between the first end and the second end, the filter candle including a flushing element arranged in the interior of the filter candle and being rotatable about the central axis, the flushing element being divided into a flushing section provided with at least one flushing port for backflushing part of the cylindrical filter wall and a turbine section provided with a turbine adapted to rotate the flushing element, the flushing section having a first end and a second end and being formed as a hollow shaft tapering from the first end to the second end, the at least one flushing port being provided in at least one flushing rib arranged on the hollow shaft and extending from the first to the second end of the flushing section, the turbine section having a first end and a second end and being formed as a hollow shaft tapering from the first end to the second end and the turbine being formed by turbine blades arranged on the outside of the hollow shaft of the turbine section, the first end of the flushing section being connected to the first end of the turbine section at a transition position.

Related Art

WO 2014/080329 A1 discloses a filter candle for a backflush filter, wherein a flushing element is arranged rotatably about a central axis of the filter candle. The flushing element is divided into a flushing section provided with a longitudinal flushing port for backflushing a first part of the cylindrical filter wall extending at the flushing section and a turbine section provided with a turbine adapted to rotate the flushing element. During backflushing, the end of the filter candle at the turbine section is connected to a flushing outlet and the other end of the filter candle at the flushing section is still connected to an inlet for unfiltered fluid. Thereby, unfiltered fluid flows from the flushing section to the turbine section and drives the turbine before exiting through the flushing outlet. In this way, a second part of the cylindrical filter wall extending at the turbine section is cleaned by a combination of cross-flow of unfiltered fluid and backflush of filtered fluid.

WO 2018/002384 A1 discloses a backflush filter with a single filter candle provided with an internally rotating flushing element having longitudinally extending helical flushing ribs with flushing ports for backflushing the filter candle. The opening of the flushing ports is oblique in relation to the radial direction of the filter candle, whereby the suction effect of the flushing ports creates a rotation of the flushing element.

SUMMARY OF THE INVENTION

The object of the present invention is to provide a filter candle of the type having a cylindrical filter wall and an internal flushing element being rotatable by means of fluid flow wherein the cylindrical filter wall may be cleaned more efficiently during a backflushing operation.

In view of this object, an outside of the flushing element forms a cylindrical restriction at the transition position adapted to, during a backflushing operation, at least substantially restrict fluid flow from the flushing section to the turbine section between the cylindrical restriction and an inside of the cylindrical filter wall, and the cylindrical restriction has an outer diameter being at least 85 percent of the inner diameter of the cylindrical filter wall.

In this way, by at least substantially restricting fluid flow from the flushing section to the turbine section along the inside of the cylindrical filter wall during backflushing, a lower pressure may be created internally in the filter candle at the turbine section, thereby forcing already filtered fluid to flow in through the part of the cylindrical filter wall of the filter candle extending at the turbine section. By substantially increasing backflushing of said part of the filter wall when reducing crossflow along said part of the filter wall, a significant better cleaning action may be achieved in said part of the filter wall.

In an embodiment, the cylindrical restriction may have an outer diameter being at least 87 percent, preferably at least 89 percent and most preferred at least 91 percent of the inner diameter of the cylindrical filter wall. Thereby, during backflushing, the pressure created internally in the filter candle at the turbine section may be even further reduced, thereby even better forcing already filtered fluid to flow in through the part of the cylindrical filter wall of the filter candle extending at the turbine section, and thereby an even better cleaning action may be achieved in said part of the filter wall.

In an embodiment, the cylindrical restriction has an outer diameter being less than 98 percent, preferably less than 96 percent and most preferred less than 94 percent of the inner diameter of the cylindrical filter wall. Thereby, during filtering, whereby fluid to be filtered flows from the interior to the outside of the filter candle, it may be ensured that a substantial part of the fluid to be filtered flows inside of the filter candle from the flushing section of the flushing element to the turbine section of the flushing element. Thereby, a good filter action may be ensured.

In an embodiment, the cylindrical restriction has an outer diameter being at least 87 percent and less than 98 percent of the inner diameter of the cylindrical filter wall.

In an embodiment, the cylindrical restriction has an outer diameter being at least 89 percent and less than 98 percent of the inner diameter of the cylindrical filter wall.

In an embodiment, the cylindrical restriction has an outer diameter being at least 91 percent and less than 98 percent of the inner diameter of the cylindrical filter wall.

In an embodiment, the cylindrical restriction has an outer diameter being at least 87 percent and less than 96 percent of the inner diameter of the cylindrical filter wall.

In an embodiment, the cylindrical restriction has an outer diameter being at least 89 percent and less than 96 percent of the inner diameter of the cylindrical filter wall.

In an embodiment, the cylindrical restriction has an outer diameter being at least 91 percent and less than 96 percent of the inner diameter of the cylindrical filter wall.

In an embodiment, the cylindrical restriction has an outer diameter being at least 87 percent and less than 94 percent of the inner diameter of the cylindrical filter wall.

In an embodiment, the cylindrical restriction has an outer diameter being at least 89 percent and less than 94 percent of the inner diameter of the cylindrical filter wall.

In an embodiment, the cylindrical restriction has an outer diameter being at least 91 percent and less than 94 percent of the inner diameter of the cylindrical filter wall.

In an embodiment, the turbine blades of the turbine section extend at least substantially over the entire length of the turbine section from the first end of the turbine section to the second end of the turbine section. Thereby, a more efficient rotation of the flushing element may be obtained.

In an embodiment, the total flow area of the at least one flushing port is smaller than, preferably smaller than 90 percent of, and most preferred smaller than 80 percent of the internal flow area of the second end of the turbine section. Thereby, a more efficient backflushing effect may be achieved by means of the at least one flushing port.

In an embodiment, the internal flow area of the second end of the turbine section is within a range of ±25%, preferably within a range of ±10%, and most preferred within a range of ±5% of the external flow area of the second end of the turbine section formed between the second end of the turbine section and the cylindrical filter wall of the filter candle.

In an embodiment, the flushing rib is helical. Thereby, a possible connection of the filter medium forming the cylindrical filter wall, positioned at a certain angular position of the filter candle, may be formed without perforations through the filter medium. For instance, in the case of a metal filter medium, such a connection of the filter medium may be a welding. Because the flushing rib is helical, it may be avoided that the entire area of the at least one flushing port of the flushing rib is simultaneously closed by the connection of the filter medium without perforation. In that case, a vacuum could cause the at least one flushing port to stick to the filter medium. Therefore, a more smooth operation of the flushing element may be obtained.

In an embodiment, the flushing element is arranged rotatably about a central spindle which is journaled in a first support element arranged at the first end of the filter candle and which is journaled in a second support element arranged at the second end of the filter candle, a first O-ring is arranged at the periphery of the cylindrical filter wall in a groove formed between a ring-formed part of the first support element and a first ring-formed part fixed on the cylindrical filter wall, a second O-ring is arranged at the periphery of the cylindrical filter wall in a groove formed between a ring-formed part of the second support element and a second ring-formed part fixed on the cylindrical filter wall, the central spindle is axially fixed in the first support element, and a tightening bolt is threaded onto the central spindle on the side of the second support element facing away from the filter candle. Thereby, mounting and demounting of the filter candle in a corresponding filter housing may be facilitated in that the filter candle may be fixed and tightened in corresponding bores of the filter housing by tightening the tightening bolt whereby the first and second O-rings are compressed in their corresponding grooves and thereby expand in the radial direction of the filter candle. The expanded O-rings may press and seal against the corresponding bores of the filter housing.

In an embodiment, a backflush filter includes a filter housing and a single filter candle as described above, a filter housing inlet for fluid to be filtered is directly connected to the first end of the filter candle, the cylindrical filter wall is surrounded by a filter chamber connected to a filter housing outlet for filtered fluid, and a flushing outlet of the filter housing is directly connected to the second end of the filter candle.

The present invention further relates to a method for operating a filter candle arranged in a backflush filter housing, the filter candle having a cylindrical filter wall which encloses an interior of the filter candle and which is formed by a filter medium, the filter candle including a flushing element arranged in the interior of the filter candle and being rotatable about a central axis of the filter candle, the flushing element being divided into a flushing section provided with at least one flushing port for backflushing part of the cylindrical filter wall and a turbine section provided with a turbine adapted to rotate the flushing element, the flushing section and the turbine section being connected at a transition position, whereby, during normal operation of the filter candle, fluid to be filtered is provided to flow through at least one end of the filter candle to the interior of the filter candle and through the filter medium to an outside of the filter candle, whereby, during backflushing operation of the filter candle, already filtered fluid is caused to flow from the outside of the filter candle, through at least part of the filter medium, through the at least one flushing port of the flushing section, through the interior of the flushing element, out through an end of the filter candle and out through a flushing outlet of the backflush filter housing, and whereby, during backflushing operation of the filter candle, the turbine is driven by means of at least part of the fluid flowing to the flushing outlet, thereby rotating the flushing element.

The method is characterised in that an outside of the flushing element forms a cylindrical restriction at the transition position, and in that, during backflushing operation, fluid flow from the flushing section to the turbine section of the flushing element is being restricted between the cylindrical restriction and an inside of the cylindrical filter wall to such an extent that the part of the cylindrical filter wall of the filter candle extending at the turbine section is being backflushed by means of fluid also driving the turbine. Thereby, the above-mentioned features may be obtained.

BRIEF DESCRIPTION OF THE DRAWINGS

The invention will now be explained in more detail below by means of examples of embodiments with reference to the very schematic drawing, in which.

DETAILED DESCRIPTION

Figure 1:
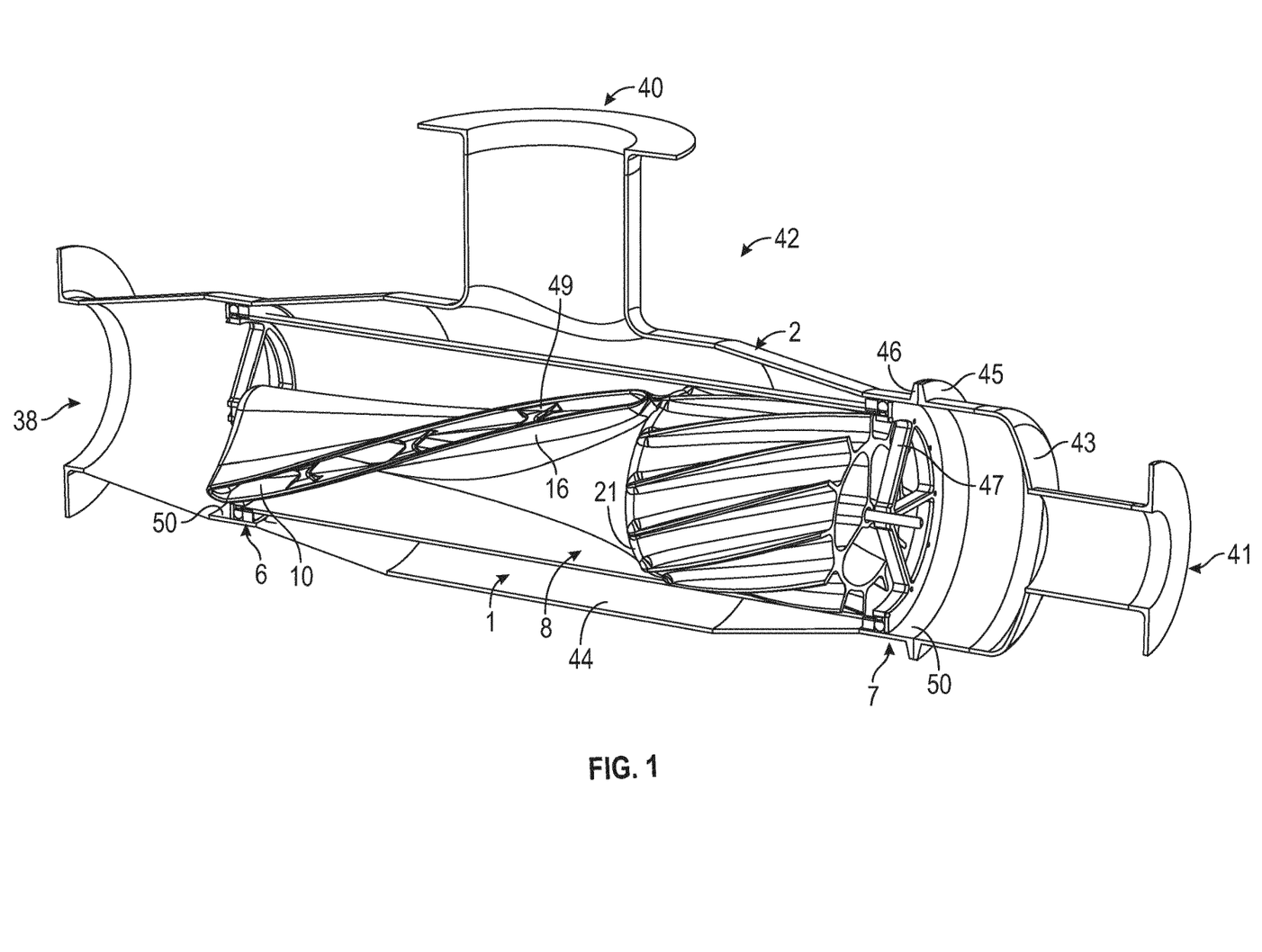
FIG. 1 is a perspective view of an axial cross-section through a backflush filter according to the invention.
Figure 2:
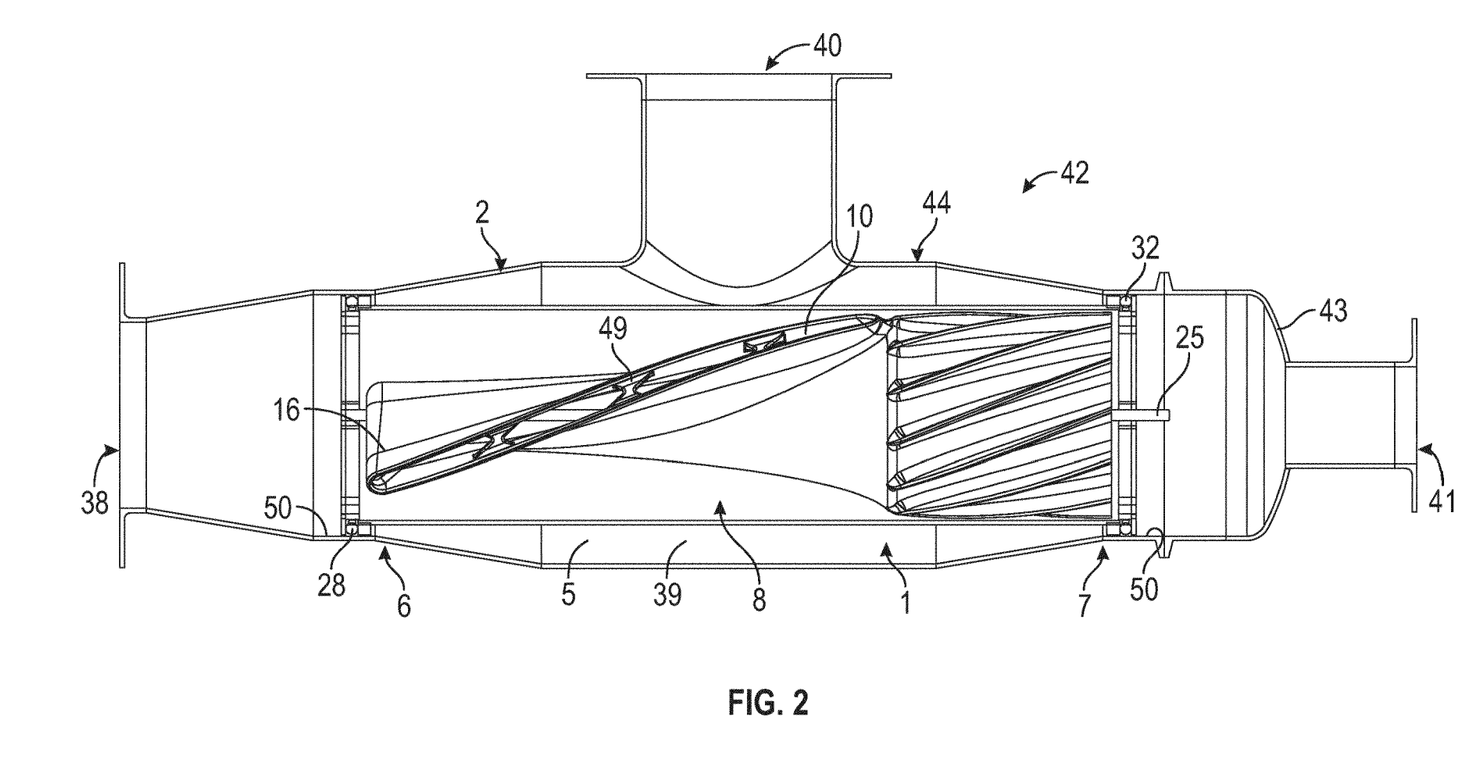
FIG. 2 is a front view of the axial cross-section through the backflush filter of FIG. 1.
Figure 3:
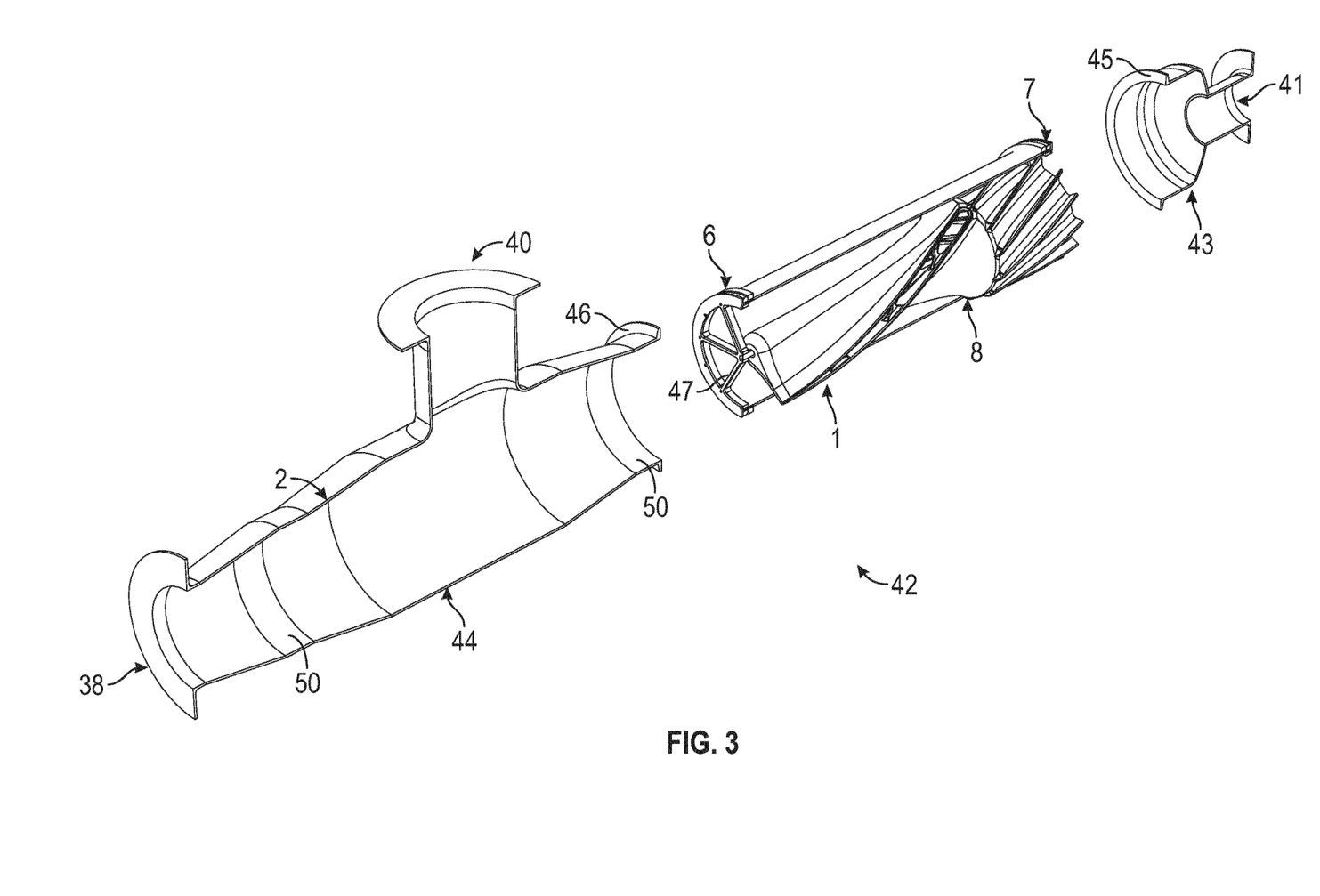
FIG. 3 is an exploded view of the axial cross-section through the backflush filter of FIG. 1.

FIGS. 1 to 3 illustrate a backflush filter 42 including a backflush filter housing 2 and a filter candle 1 according to the present invention mounted therein. FIGS. 4 to 7 illustrate in more detail a slightly different embodiment of a filter candle 1 according to the present invention which is also suitable for mounting in the filter housing 2 of the backflush filter 42 illustrated in FIGS. 1 to 3. The backflush filter 42 may for instance be used for filtering sewage water, fresh water, portable water as well as seawater or saltwater.

Figure 4:
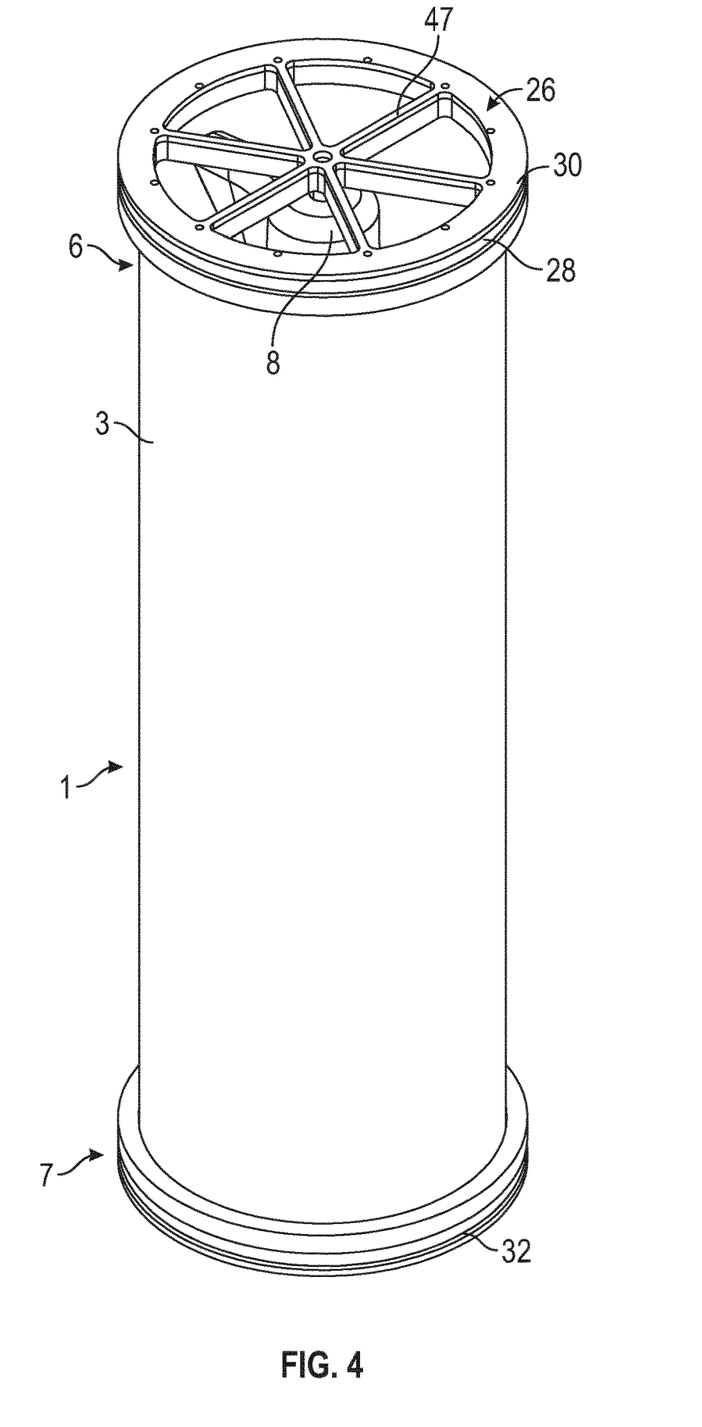
FIG. 4 is a perspective view of another embodiment of a filter candle suitable for the backflush filter of FIG. 1.
Figure 5:
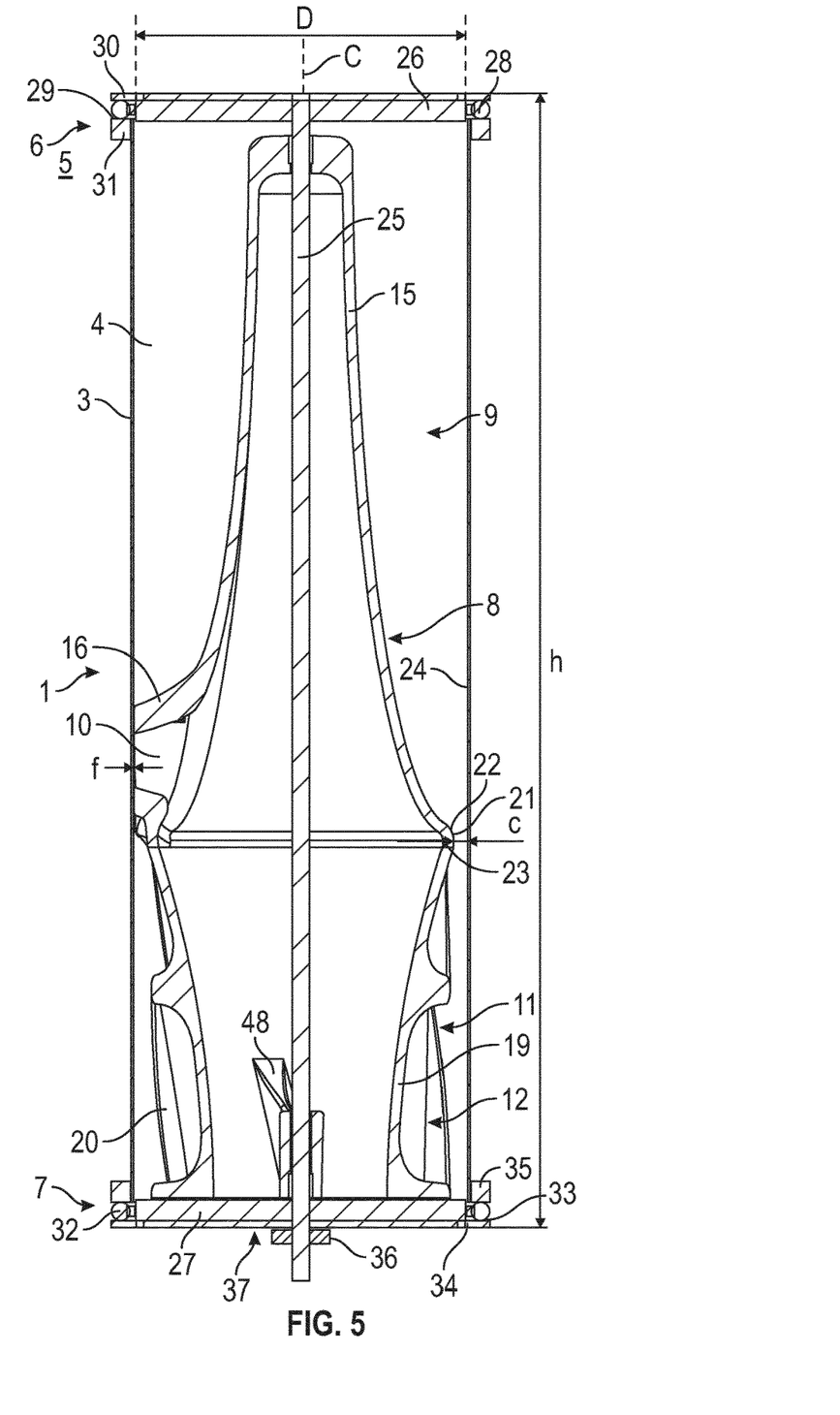
FIG. 5 is an axial cross-section through the filter candle of FIG. 4.
Figure 6:
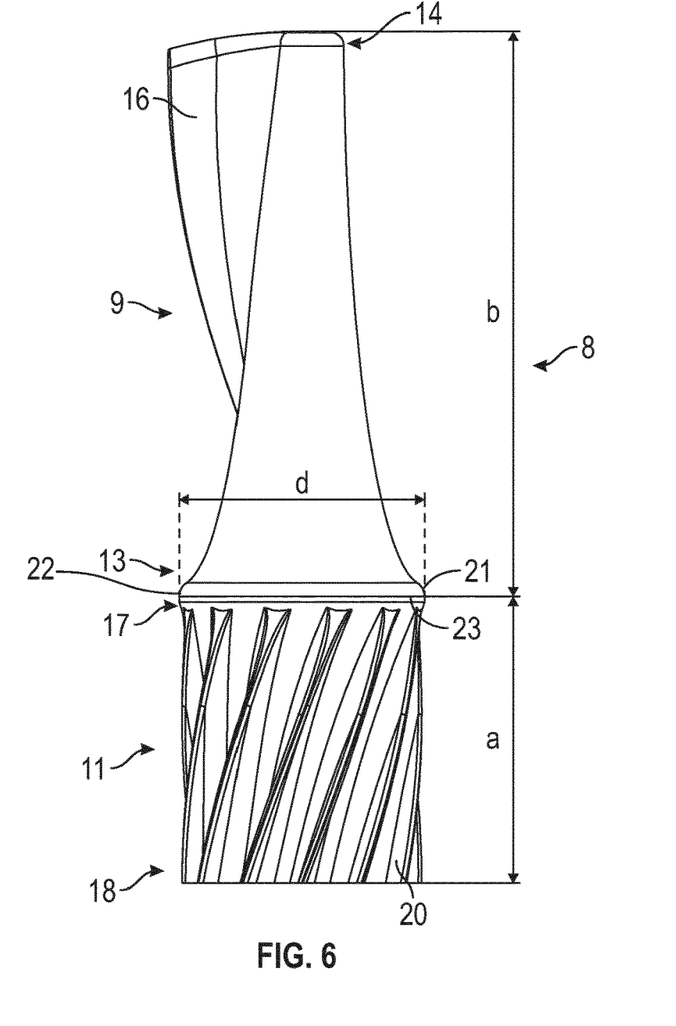
FIG. 6 is a front view of a flushing element of the filter candle of FIG. 4.
Figure 7:
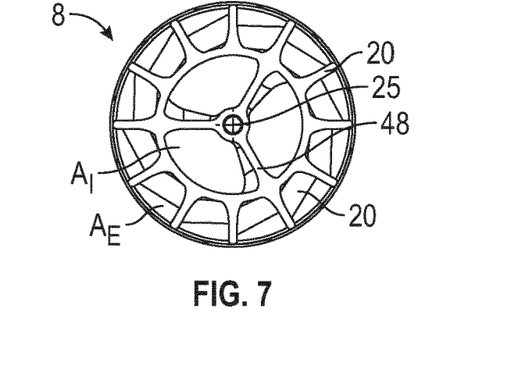
FIG. 7 is an end view of the flushing element of FIG. 6.

As seen in FIGS. 4 and 5, the filter candle 1 has a cylindrical filter wall 3 which encloses an interior 4 of the filter candle 1 and which is formed by a filter medium through which fluid to be filtered may flow from the interior 4 to an outside 5 of the filter candle. Many suitable filter media are known to the skilled person within the technical field, but one example is a perforated metal plate having perforations adapted to the size of the particles to be filtered. The cylindrical filter wall 3 has an inner diameter D. The filter candle 1 has a first end 6 and a second end 7 of which both ends are open for fluid flow to and from the interior 4 of the filter candle 1. The filter candle 1 further has a central axis C extending between the first end 6 and the second end 7, and the filter candle 1 includes a flushing element 8 arranged in the interior 4 of the filter candle 1 and being rotatable about the central axis C. The flushing element 8 is divided into a flushing section 9 provided with a flushing port 10 for backflushing part of the cylindrical filter wall 3 and a turbine section 11 provided with a turbine 12 adapted to rotate the flushing element 8. Referring to FIGS. 5 and 6, the flushing section 9 has a first end 13 and a second end 14 and is formed as a hollow shaft 15 tapering from the first end 13 to the second end 14. The flushing port 10 is provided in a flushing rib 16 arranged on the hollow shaft 15 and extending helically from the first to the second end of the flushing section 9. The turbine section 11 has a first end 17 and a second end 18 and is formed as a hollow shaft 19 tapering from the first end 17 to the second end 18. The turbine 12 is formed by turbine blades 20 arranged on the outside of the hollow shaft 19 of the turbine section 11. The first end 13 of the flushing section 9 is connected to the first end 17 of the turbine section 11 at a transition position 21, and an outside 22 of the flushing element 8 forms a cylindrical restriction 23 at the transition position 21. The cylindrical restriction 23 has an outer diameter d being at least 85 percent of the inner diameter D of the cylindrical filter wall 3 and in this way the cylindrical restriction 23 is adapted to, during a backflushing operation, at least substantially restrict fluid flow from the flushing section 9 to the turbine section 11 between the cylindrical restriction 23 and an inside 24 of the cylindrical filter wall 3.

As seen in FIGS. 1 to 3, the backflush filter housing 2 includes a main section 44 in the form of a T-piece and a flushing outlet section 43 in the form of a tube section. The main section 44 has a main tubular section forming a flanged filter housing inlet 38 for fluid to be filtered at one end and a flange 46 arranged at an opposed end and connected with a flange 45 of the flushing outlet section 43. The filter candle 1 is arranged in the main tubular section of the main section 44 of the backflush filter housing 2 with its first end 6 tightly fitted into a bore 50 at the end of the filter housing inlet 38 and its second end tightly fitted into a bore 50 at the end of the flange 46, as will be explained in further detail below. Thereby, the filter housing inlet 38 is directly connected to the first end 6 of the filter candle 1, and the cylindrical filter wall 3 is surrounded by a filter chamber 39 formed by the main tubular section of the main section 44 of the backflush filter housing 2. The main section 44 further has a side branch in the form of a tube section connected at right angles with the main tubular section and having a flanged filter housing outlet 40 for filtered fluid. In this way, the filter chamber 39 is connected to the filter housing outlet 40 and thereby connects the outside of the cylindrical filter wall 3 with the filter housing outlet 40. The flushing outlet section 43 has a first end with the flange 45 connected with the flange 46 of the main section 44 and a second end forming a flanged flushing outlet 41 of the filter housing 2. Thereby, the flushing outlet 41 is directly connected to the second end 7 of the filter candle 1. As seen, the flushing outlet section 43 forms a narrowing so that the flushing outlet 41 has a substantially smaller flange diameter than the diameter of the flange 45.

Referring to FIGS. 4 and 5, the flushing element 8 is arranged rotatably about a central spindle 25 which is journaled in a first support element 26 arranged at the first end 6 of the filter candle 1 and which is journaled in a second support element 27 arranged at the second end 7 of the filter candle 1. As seen, the first and second support elements 26, 27 have the form of a ring A first O-ring 28 is arranged at the periphery of the cylindrical filter wall 3 in a groove 29 formed between a ring-formed part 30 of the first support element 26 and a first ring-formed part 31 fixed on the cylindrical filter wall 3. A second O-ring 32 is arranged at the periphery of the cylindrical filter wall 3 in a groove 33 formed between a ring-formed part 34 of the second support element 27 and a second ring-formed part 35 fixed on the cylindrical filter wall 3. The central spindle 25 is axially fixed in the first support element 26 in a central bore formed centrally in a rib structure including six radially arranged ribs 47. The central spindle 25 is arranged axially displaceably in the second support element 27 in a central bore formed centrally in a rib structure including six radially arranged ribs 47. A tightening bolt 36 (only illustrated in FIG. 5) is threaded onto the central spindle 25 on the side 37 of the second support element 27 facing away from the filter candle 1. Thereby, mounting and demounting of the filter candle 1 in the filter housing 2 may be facilitated in that the filter candle 1 may be fixed and tightened in the corresponding bores 50 of the filter housing 2 by tightening the tightening bolt 36 whereby the first and second O-rings 28, 32 are compressed in their corresponding grooves 29, 33 and thereby expand in the radial direction of the filter candle 1. The expanded O-rings 28, 32 may press and seal against the corresponding bores 50 of the filter housing, thereby arranging the filter candle 1 in the main tubular section of the main section 44 with its first end 6 tightly fitted into the bore 50 at the end of the filter housing inlet 38 and its second end tightly fitted into the bore 50 at the end of the flange 46. In order to access the filter candle 1 for mounting or demounting, the flushing outlet section 43 is simply detached from the main section 44 by disconnecting the connection between the flanges 45, 46. Thereby, the filter candle 1 may fast and easily be replaced by a new filter candle or be taken out for inspection.

During normal filtering operation of the backflush filter 42 with filter candle 1, fluid to be filtered is provided to flow into the filter housing inlet 38 and therefrom through the first end 6 of the filter candle 1 to the interior 4 of the filter candle 1 and through the filter medium to the outside 5 of the filter candle 1 which is arranged in the filter chamber 39. Because, during normal filtering operation, the fluid flow at the restriction 23 is relatively slow compared to during backflushing operation, a substantial part of the fluid to be filtered flows inside of the filter candle 1 from the flushing section 9 of the flushing element 8 to the turbine section 11 of the flushing element and out through the filter medium to the outside 5 of the filter candle 1 in the filter chamber 39. Thereby, the entire filter medium of the filter candle 1 is used for filtering fluid.

From the filter chamber 39, the filtered fluid flows out through the filter housing outlet 40. During the normal filtering operation, fluid flow through the flushing outlet 41, which is directly connected to the second end 7 of the filter candle 1, is prevented by means of a not shown closed valve connected to the flushing outlet 41.

At regular intervals, or when necessary, a backflushing operation is performed. During a backflushing operation of the backflush filter 42 with the filter candle 1, the above-mentioned not shown valve connected to the flushing outlet 41 is opened. Thereby, already filtered fluid is caused to flow from the outside 5 of the filter candle, through the filter medium and through the flushing port 10 of the flushing section 9, through the interior of the flushing element 8, out through the second end 7 of the filter candle 1 and out through the flushing outlet 41 of the backflush filter housing 2. During the backflushing operation, the turbine 12 is driven by means of a part of the fluid flowing to the flushing outlet 41, thereby rotating the flushing element 8. By rotating the flushing element 8, the flushing port 10 of the flushing section 9 swipes the part of the inside 24 of the cylindrical filter wall 3 extending at the flushing section 9 and thereby removes residues from the inside 24 of the cylindrical filter wall 3. The part of the fluid driving the turbine 12 flows on the outside of the turbine section 11 of the flushing element to the flushing outlet 41 and thereby creates an eductor effect at the second end 18 of the turbine section 11 whereby the part of the fluid flowing inside the turbine section 11 of the flushing element and exiting the second end 18 of the turbine section 11 is accelerated. Thereby the fluid flowing in through the flushing port 10 is accelerated and the cleaning action on the inside 24 of the cylindrical filter wall 3 is improved. Furthermore, during the backflushing operation, fluid flow from the flushing section 9 to the turbine section 11 of the flushing element 8 is being restricted between the cylindrical restriction 23 and the inside 24 of the cylindrical filter wall 3 to such an extent that, due to a pressure drop at the turbine section, the part of the cylindrical filter wall 3 of the filter candle 1 extending at the turbine section 11 is being backflushed by means of fluid also driving the turbine 12.

By restricting fluid flow from the flushing section 9 to the turbine section 11 along the inside of the cylindrical filter wall 3 during backflushing, a lower pressure is created internally in the filter candle 1 at the turbine section, thereby forcing already filtered fluid to flow in through the part of the cylindrical filter wall 3 of the filter candle 1 extending at the turbine section. By substantially increasing backflushing of said part of the filter wall 3, although crossflow along said part of the filter wall is reduced, a significant better cleaning action may be achieved in said part of the filter wall. This is particularly advantageous when the filter candle 1 is arranged as a single filter candle in a housing as illustrated in the figures, because in a single filter housing, backwashing of the part of the cylindrical filter wall 3 of the filter candle 1 extending at the turbine section is only backwashed by means of filtered water from the same filter, as opposed to filter housings including several filter candles as described further below wherein this part of the filter may be backwashed by filtered water from several other filters in the housing.

The cylindrical restriction 23 may for instance have an outer diameter d being at least 87 percent, preferably at least 89 percent and most preferred at least 91 percent of the inner diameter D of the cylindrical filter wall 3. Thereby, during backflushing, the ores-sure created internally in the filter candle 1 at the turbine section 11 may be even further reduced, thereby even better forcing already filtered fluid to flow in through the part of the cylindrical filter wall 3 of the filter candle extending at the turbine section 11, and thereby an even better cleaning action may be achieved in said part of the filter wall 3.

The cylindrical restriction 23 may have an outer diameter d being less than 98 percent, preferably less than 96 percent and most preferred less than 94 percent of the inner diameter D of the cylindrical filter wall 3. Thereby, during filtering, whereby fluid to be filtered flows from the interior to the outside of the filter candle 1, it may be ensured that a substantial part of the fluid to be filtered flows inside of the filter candle 1 from the flushing section 9 of the flushing element 8 to the turbine section 11 of the flushing element. Thereby, a good filter action may be ensured.

As seen in the embodiments illustrated, the turbine blades 20 of the turbine section 11 extend over the entire length of the turbine section 11 from the first end 17 of the turbine section to the second end 18 of the turbine section.

The total flow area of the flushing port 10 is smaller than, preferably smaller than 90 percent of, and most preferred smaller than 80 percent of the internal flow area $A_I$ of the second end 18 of the turbine section 11.

The internal flow area $A_I$ of the second end 18 of the turbine section 11 is within a range of ±25%, preferably within a range of ±10%, and most preferred within a range of ±5% of the external flow area $A_E$ of the second end 18 of the turbine section 11 formed between the second end 18 of the turbine section 11 and the cylindrical filter wall 3 of the filter candle 1.

As seen in FIG. 5, the cross-section of the flushing section 9 of the flushing element preferably tapers non-linearly, along a curved line. Furthermore, the cross-section of the turbine section 11 of the flushing element preferably tapers non-linearly, along a curved line. Preferably, the length b of the flushing section 9 equals approximately two times the length of the turbine section 11. The flushing element 8 is preferably made of plastic reinforced with carbon fibres, but any suitable material may be used. As further seen, the flushing port 10 is provided with reinforcing ribs 49.

Although the filter candle 1 according to the present invention has been illustrated in the figures as a single filter mounted in a filter housing 2, and although the filter candle 1 according to the present invention is particularly advantageous in such a single filter housing, the filter candle 1 according to the present invention may also be employed in a filter housing including several filter candles 1. Such a filter housing including several filter candles is illustrated in FIG. 1 of WO 2014/080329 A1 mentioned above and is described in more detail in that document. In this filter housing including several filter candles, one or more filter candles may be cleaned simultaneously at the same time as the remaining filter candles are continuing their normal filtering operation. This may be achieved by means of a movable flushing arm connecting to the flushing outlet of the filter or filters to be cleaned.

LIST OF REFERENCE NUMBERS a length of turbine section
$A_I$ internal flow area of second end of turbine section
$A_E$ external flow area of second end of turbine section
b length of flushing section
c clearance between cylindrical restriction and inside of filter wall
C central axis of filter candle
d outer diameter of cylindrical restriction
D inner diameter of cylindrical filter wall
f clearance between flushing rib and inside of filter wall
h height of filter candle between ends of support elements 1 filter candle
2 backflush filter housing
3 cylindrical filter wall
4 interior of filter candle
5 outside of filter candle
6 first end of filter candle
7 second end of filter candle
8 flushing element
9 flushing section of flushing element
10 flushing port of flushing section
11 turbine section of flushing element
12 turbine of turbine section
13 first end of flushing section
14 second end of flushing section
15 hollow shaft forming flushing section
16 flushing rib arranged on hollow shaft
17 first end of turbine section
18 second end of turbine section
19 hollow shaft forming turbine section
20 turbine blade of turbine section
21 transition position between flushing section and turbine section
22 outside of flushing element
23 cylindrical restriction formed on outside of flushing element
24 inside of cylindrical filter wall
25 central spindle of filter candle
26 first support element
27 second support element
28 first O-ring
29 groove
30 ring-formed part of first support element
31 first ring-formed part fixed on cylindrical filter wall
32 second O-ring
33 groove
34 ring-formed part of second support element
35 second ring-formed part fixed on cylindrical filter wall
36 tightening bolt
37 side of second support element facing away from filter candle
38 filter housing inlet
39 filter chamber
40 filter housing outlet
41 flushing outlet of filter housing
42 backflush filter
43 flushing outlet section of filter housing
44 main section of filter housing
45 flange of flushing outlet section of filter housing
46 flange of main section of filter housing
47 rib of first support element
48 internal turbine blade of turbine section
49 reinforcing rib of flushing port
50 bore of filter housing

The invention claimed is:

1. A filter candle for mounting in a backflush filter housing, the filter candle comprising:
a cylindrical filter wall which encloses an interior of the filter candle and which is formed by a filter medium through which fluid to be filtered may flow from the interior to an outside of the filter candle, the cylindrical filter wall having an inner diameter;
a first end and a second end of which at least one is open for fluid flow to the interior of the filter candle and a central axis extending between the first end and the second end;
a flushing element arranged in the interior of the filter candle and being rotatable about the central axis, the flushing element being divided into a flushing section provided with at least one flushing port for backflushing part of the cylindrical filter wall and a turbine section provided with a turbine for rotating the flushing element, the flushing section having a first end and a second end and being formed as a hollow shaft tapering from the first end to the second end, the at least one flushing port being provided in at least one flushing rib arranged on the hollow shaft and extending from the first to the second end of the flushing section, the turbine section having a first end and a second end and being formed as a hollow shaft tapering from the first end to the second end and the turbine being formed by turbine blades arranged on the outside of the hollow shaft of the turbine section, the first end of the flushing section being connected to the first end of the turbine section at a transition position, wherein
an outside of the flushing element forms a cylindrical restriction at the transition position for, during a backflushing operation, at least substantially restricting fluid flow from the flushing section to the turbine section between the cylindrical restriction and an inside of the cylindrical filter wall, and
the cylindrical restriction has an outer diameter being at least 85 percent of the inner diameter of the cylindrical filter wall.

2. A filter candle according to claim 1, wherein the cylindrical restriction has an outer diameter being at least 87 percent of the inner diameter of the cylindrical filter wall.

3. A filter candle according to claim 2, wherein the cylindrical restriction has an outer diameter being less than 98 percent of the inner diameter of the cylindrical filter wall.

4. A filter candle according to claim 2, wherein the turbine blades of the turbine section extend at least substantially over the entire length of the turbine section from the first end of the turbine section to the second end of the turbine section.

5. A filter candle according to claim 2, wherein the total flow area of the at least one flushing port is smaller than the internal flow area of the second end of the turbine section.

6. A filter candle according to claim 2, wherein the internal flow area of the second end of the turbine section is within a range of ±25% of the external flow area of the second end of the turbine section formed between the second end of the turbine section and the cylindrical filter wall of the filter candle.

7. A filter candle according to claim 1, wherein the cylindrical restriction has an outer diameter being less than 98 percent of the inner diameter of the cylindrical filter wall.

8. A filter candle according to claim 7, wherein the turbine blades of the turbine section extend at least substantially over the entire length of the turbine section from the first end of the turbine section to the second end of the turbine section.

9. A filter candle according to claim 7, wherein the total flow area of the at least one flushing port is smaller than the internal flow area of the second end of the turbine section.

10. A filter candle according to claim 7, wherein the internal flow area of the second end of the turbine section is within a range of ±25% of the external flow area of the second end of the turbine section formed between the second end of the turbine section and the cylindrical filter wall of the filter candle.

11. A filter candle according to claim 1, wherein the turbine blades of the turbine section extend at least substantially over the entire length of the turbine section from the first end of the turbine section to the second end of the turbine section.

12. A filter candle according to claim 11, wherein the total flow area of the at least one flushing port is smaller than the internal flow area of the second end of the turbine section.

13. A filter candle according to claim 11, wherein the internal flow area of the second end of the turbine section is within a range of ±25% of the external flow area of the second end of the turbine section formed between the second end of the turbine section and the cylindrical filter wall of the filter candle.

14. A filter candle according to claim 1, wherein the total flow area of the at least one flushing port is smaller than the internal flow area of the second end of the turbine section.

15. A filter candle according to claim 14, wherein the internal flow area of the second end of the turbine section is within a range of ±25% of the external flow area of the second end of the turbine section formed between the second end of the turbine section and the cylindrical filter wall of the filter candle.

16. A filter candle according to claim 1, wherein the internal flow area of the second end of the turbine section is within a range of ±25% of the external flow area of the second end of the turbine section formed between the second end of the turbine section and the cylindrical filter wall of the filter candle.

17. A filter candle according to claim 1, wherein the flushing rib is helical.

18. A filter candle according to claim 1, wherein
the flushing element is arranged rotatably about a central spindle which is journaled in a first support element arranged at the first end of the filter candle and which is journaled in a second support element arranged at the second end of the filter candle,
a first O-ring is arranged at the periphery of the cylindrical filter wall in a groove formed between a ring-formed part of the first support element and a first ring-formed part fixed on the cylindrical filter wall, wherein a second O-ring is arranged at the periphery of the cylindrical filter wall in a groove formed between a ring-formed part of the second support element and a second ring-formed part fixed on the cylindrical filter wall,
the central spindle is axially fixed in the first support element, and
a tightening bolt is threaded onto the central spindle on the side of the second support element facing away from the filter candle.

19. A backflush filter including a filter housing and a single filter candle according to claim 1, wherein
a filter housing inlet for fluid to be filtered is directly connected to the first end of the filter candle, wherein the cylindrical filter wall is surrounded by a filter chamber connected to a filter housing outlet for filtered fluid, and
a flushing outlet of the filter housing is directly connected to the second end of the filter candle.

20. A method for operating a filter candle arranged in a backflush filter housing, the filter candle having a cylindrical filter wall which encloses an interior of the filter candle and which is formed by a filter medium, the filter candle including a flushing element arranged in the interior of the filter candle and being rotatable about a central axis of the filter candle, the flushing element being divided into a flushing section provided with at least one flushing port for backflushing part of the cylindrical filter wall and a turbine section provided with a turbine for rotating the flushing element, the flushing section and the turbine section being connected at a transition position, the method comprising:
during normal operation of the filter candle, providing fluid to be filtered to flow through at least one end of the filter candle to the interior of the filter candle and through the filter medium to an outside of the filter candle;
during backflushing operation of the filter candle, causing already filtered fluid to flow from the outside of the filter candle, through at least part of the filter medium, through the at least one flushing port of the flushing section, through the interior of the flushing element, out through an end of the filter candle and out through a flushing outlet of the backflush filter housing; and
during backflushing operation of the filter candle, driving the turbine by means of at least part of the fluid flowing to the flushing outlet, thereby rotating the flushing element, wherein
an outside of the flushing element forms a cylindrical restriction at the transition position, and
during backflushing operation, fluid flow from the flushing section to the turbine section of the flushing element is being restricted between the cylindrical restriction and an inside of the cylindrical filter wall to such an extent that the part of the cylindrical filter wall of the filter candle extending at the turbine section is being backflushed by means of fluid also driving the turbine.

\* \* \* \* \*